June 21, 1966 R. F. POST 3,257,284
METHOD OF CONTROLLING PLASMA STABILITY
Filed July 12, 1963
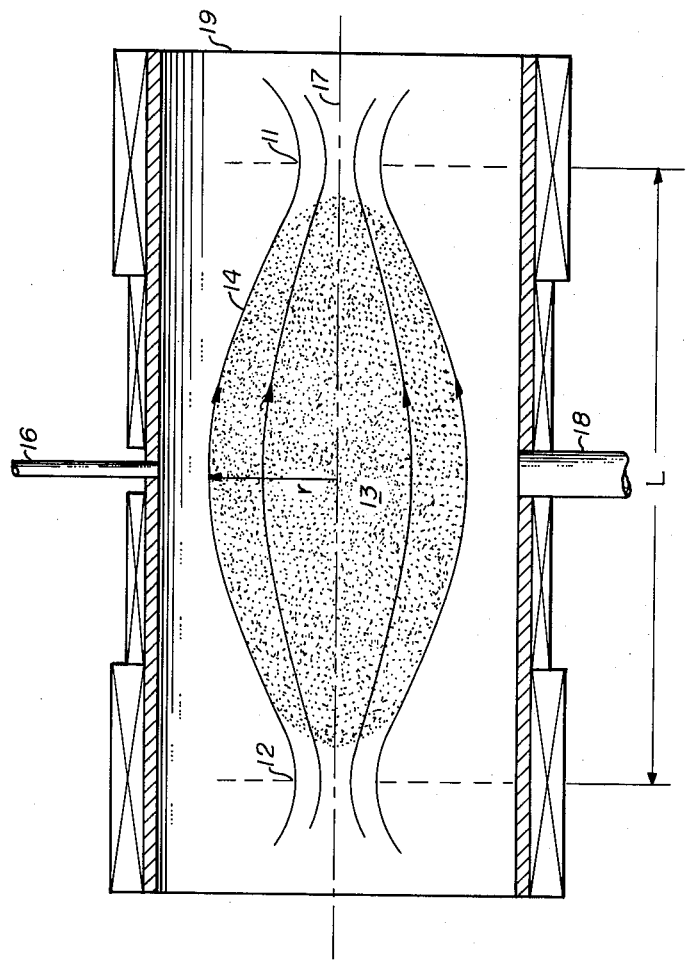
INVENTOR.
RICHARD F. POST
BY
*Roland A. Anderson*
ATTORNEY

United States Patent Office 3,257,284
Patented June 21, 1966

3,257,284
METHOD OF CONTROLLING PLASMA STABILITY
Richard F. Post, Walnut Creek, Calif., assignor to the United States of America as represented by the United States Atomic Energy Commission
Filed July 12, 1963, Ser. No. 294,777
4 Claims. (Cl. 176—5)

The invention described herein was made in the course of, or under, Contract W–7405–ENG–48 with the United States Atomic Energy Commission.

The present invention relates in general to a method of controlling the stability condition of magnetically confined high temperature plasmas. More particularly, it relates to a method of controlling the stability condition of such plasmas by changing the "effective" particle orbit radius through the introduction into the plasma of plasma particle additives of predetermined characteristics.

It has long been known that a controlled thermonuclear fusion reaction in which there is a net gain of energy is theoretically possible, and consequently is a potential source of useful power. However, as a result of the high temperatures and pressures that are characteristic of the reacting plasma, and the fact that the mean free path for fusion of the plasma particles is enormous, the use of material walls for confinement of a thermonuclear reaction plasma is not feasible. Although various schemes have been proposed as possible solutions to the confinement problem, those which demonstrate the most promise to date depend upon magnetic fields for the confinement of the thermonuclear fusion reaction plasma.

However, in attempting to confine plasmas with magnetic fields under conditions appropriate for the establishment of a self-sustaining thermonuclear reaction the art has been confronted with a major obstacle: The existence of various types of plasma instabilities. These instabilities result in the rapid escape of the energetic plasma particles through the "magnetic wall," i.e., the magnetic confinement field, and thus a general lowering of the temperature of the reacting plasma which leads to its eventual destruction.

It has been generally recognized in the art that before a plasma may be called "stable," it must satisfy the following criteria: (1) The observed confinement time is very long compared to the theoretical time constant for growth of the slowest type of plasma instability which could conceivably exist in a given configuration. (2) The observed particle transport processes are not appreciably different from those predicted by classical collision theory.

To date in most of the attempts to create a sustained controlled thermonuclear fusion reaction, the instabilities have not been overcome for a sufficient time for the temperature of the plasma to be raised to the thermonuclear ignition temperature; a failure to satisfy the first criteria noted supra. One of the major instabilities which has prevented the achievement of such temperatures is the so-called hydromagnetic interchange instabilities.

The theory of hydromagnetic interchange instability shows that the potentially destabilizing regions of a magnetically confined plasma are those regions in which both the magnetic field strength and the plasma density decrease with increasing radius. A magnetically confined plasma will generally be in stable equilibrium when the uniform outward pressure of the plasma is exactly balanced by the magnetic pressure of the confining field. However, as a result of inhomogeneities in the magnetic field, of collisions among the plasma particles, and of the effects of electric fields disturbing the plasma, theory predicts that it is *possible* for the disturbance to cascade such that the equilibrium state of the plasma becomes unstable.

In an article entitled "Finite Larmor Radius Stabilization of 'Weakly' Unstable Confined Plasmas," by M. N. Rosenbluth et al., Nuclear Fusion, 1962 supplement, Part I, p. 143–150, it is shown that a *single species plasma* at a given temperature will be stable against hydromagnetic interchange instabilities provided a certain relationship between the length of the confinement zone, radius of the confinement zone and the mean orbit radius of the plasma ions is satisfied. This stabilizing effect of the plasma against interchange instabilities may be effected due to the disparity between the orbit size of the ions and that of the electrons of the plasma. As a result of this disparity, the ions and electrons execute transverse drifts at different velocities as they move longitudinally through the confining magnetic field. This velocity differential is called the "finite orbit effect." A charge separation is built up by this differential and hence a net force which is out of phase with the net force resulting from the characteristic charge separation due to the plasma particle drifts that drive the hydromagnetic interchange instability. Thus, by a proper balancing of these opposing forces, stability may be obtained. For a more complete exposition of the theory, attention is directed to the beforementioned reference.

Although the "finite orbit effect" exerts a stabilizing influence on the plasma, it has been found that as the density of a high temperature plasma is varied, e.g., during the build up of the plasma density, the plasma may undergo transitions from stable states of gross oscillation to that of unstable states of gross oscillations (various modes of hydromagnetic interchange instabilities).

Considerable advantage is therefore to be gained by the provision of a simple method for controlling the "finite orbit effect" (and hence stability condition) of the constituents of a magnetically confined high temperature plasma.

The present invention is such a method. It has been found that particular multi-component plasmas have stability properties which are different and can be advantageous with respect to simple one spieces, single temperature plasmas. More particularly in the plasma stability controlling method of the invention, a predetermined amount of plasma particle additives, elements added to a magnetically confined high temperature plasma which alter the "effective" particle orbit radius, are introduced into the magnetic field from plasma or ion sources and trapped in the plasma zone to adjust the net stabilizing force due to finite orbit effects to a value at least equal to the net destabilizing force driving the hydromagnetic interchange instabilities.

Accordingly, it is an object of the present invention to provide a method for controlling the stability condition of a magnetically confined high temperature plasma.

More particularly, it is an object of the invention to provide a method for controlling the stability condition of such a plasma by changing the "effective" particle orbit radius through the introduction into the plasma of plasma particles additives of predetermined characteristics.

Another object of the invention is to provide a method for introducing, trapping and confining a high temperature plasma under conditions appropriate for the establishment of a self-sustaining controlled thermonuclear reaction.

It is a further object of the invention to stabilize a magnetically confined high temperature plasma against hydromagnetic interchange instabilities.

It is still another object of the invention to stabilize a magnetically confined high temperature plasma by adjusting the "effective" particle orbit radius whereby the forces resulting from the "finite orbit effect" are equal to or greater than the forces driving the hydromagnetic interchange instabilities.

It is yet another object of the invention to provide a method for controlling the stability conditions of a plasma which allows alteration of the relationship of frequency-of-gross-plasma-oscillation to the plasma-density for a magnetically confined plasma whose density and temperature is being increased to the thermonuclear ignition point such that the plasma will be free from hydromagnetic interchange instabilities over the entire plasma density range.

Additional objects and advantages of the invention will become apparent from the following description and claims considered together with the single figure of the accompanying drawing which is a schematic illustration of apparatus suitable for operating the process of the invention.

In accordance with the present invention, the stability condition of a magnetically confined high temperature multi-component plasma is controlled by altering the relative concentration of the constituents of the multi-component plasma to adjust the "effective" particle orbit radius of the plasma constituents. In terms of the atomic mass number and charge (relative to a proton), the temperature (in kilovolts) and the density of the various constituents of a magnetically confined multi-component plasma, the "effective" particle orbit radius $\tilde{a}$ is defined by the equation $$\tilde{a}^2 = \frac{3.132 \times 10^7}{B^2} \left[ \frac{\left(\sum_\alpha N_\alpha A_\alpha T_\alpha\right)^2}{Z_\alpha} \middle/ \left(\sum_\alpha N_\alpha T_\alpha\right)\left(\sum_\alpha N_\alpha A_\alpha\right) \right] \quad (1)$$

where B is the strength of the magnetic confining field in gauss, $N_\alpha$ is the density, $A_\alpha$ is the mass number, $Z_\alpha$ is the charge (relative to a proton), and $T_\alpha$ is the temperature equivalent of the energy of an $\alpha$ constituent of the multi-component plasma. By altering the "effective" particle orbit radius, the resultant of the aforementioned net forces and hence the plasma characteristic of frequency-of-gross-plasma-oscillations as a function of plasma-density is changed. Thus, by controlling the "effective" particle orbit radius, the stability condition of the multi-component plasma can be controlled over any plasma density range. In the light of such definition of the "effective" particle orbit radius (Equation 1), it develops that its value may be altered by changing at least one of the parameters $N_\alpha$, $A_\alpha/Z_\alpha$ and $T_\alpha$. Thus, the effective particle orbit radius can be controlled by the addition of plasma particle additives having an $A_\alpha/Z_\alpha$ differing from the thermonuclear fuel ions. For example, a predetermined amount of plasma particle additives having an $A_\alpha/Z_\alpha$ ratio greater than that of the thermonuclear fuel ions can be introduced and trapped in the magnetic confinement zone to stabilize the plasma against hydromagnetic interchange instabilities.

Furthermore, it is seen that the effective particle orbit radius can be altered by changing the energy level and hence the temperature of the additives. For example, a predetermined amount of plasma particle additives which are at a higher energy level (greater temperature) than the thermonuclear fuel ions can be introduced and trapped in the magnetic confinement zone to stabilize the plasma.

Also it is seen that the effective particle orbit radius of a multi-component plasma can be controlled by increasing the density of one of the plasma constituents. However, caution must be exercised in the cases where the density of the plasma particle additives is increased to stabilize the magnetically confined plasma. For example, where the plasma particle additive's $A_\alpha/Z_\alpha$ ratio is large with respect to the thermonuclear fuel ions, e.g., hydrogen isotopes as thermonuclear fuel ions and singly ionized $C^{12}$ ions as the additive, the density of the additive should be maintained at a low level in order that losses due to radiation effects are minimized.

It must be remembered that for achievement of stability, the above characteristics of the additives must be such as to give the effective particle orbit radius a value establishing the finite orbit effect net forces at least equal to the net destabilizing force driving the hydromagnetic interchange instabilities. The actual value that the effective particle orbit radius $\tilde{a}$ must achieve is dependent upon the magnetic field geometry. The hydromagnetic interchange stability criterion for any given geometric configuration of confinement is defined by a characteristic equation which always involves $\tilde{a}$ as defined by Equation 1 as one of its variables. For example, with reference to the figure, in the case of the magnetic mirror confinement system such as that disclosed in the application of Richard F. Post and assigned to the U.S. Atomic Energy Commission, entitled Pyrotron Thermonuclear Reactor and Process, Ser. No. 443,447, filed on July 14, 1954, which issued as Patent No. 3,170,841 on Feb. 23, 1965, the stability criterion that must be satisfied is given by the dimensionless inequality:

$$\left[\frac{L\tilde{a}}{r^2}\right]^2 > C(1+\bar{b}^2) \quad (2)$$

where L is the distance between mirrors 11 and 12 and $r$ is the radius of plasma 13. The quantity $\bar{b}^2$ is defined by the equation:

$$\bar{b} = \frac{B^2}{4\pi\bar{\rho}^2 c^2} \quad (3)$$

where $\bar{\rho}$ is the mean value of the mass density of plasma 13, B is the strength of the magnet confining field 14 and $c$ is the velocity of light. The constant C is a dimensionless empirical quantity derived in each case from the detailed shape of the particular magnetic confinement field and has a value between 1 and 2.

To illustrate the theory of operation of the present invention, the stability condition of the magnetic mirror confinement system noted supra under typical operating conditions is considered.

Thermonuclear fuel: Hydrogen
  Total density _____ $10^{14}$ particles per cm.$^3$.
  Ion temperature _____ 40 kev.
  Electron temperature _____ 10 kev.
  L _____ $3 \times 10^3$ cm.
  $r$ _____ 50 cm.
  B _____ $5 \times 10^4$ gauss.
  C _____ 2.

Under these operating conditions, for stabilization to occur $$\left[\frac{L\tilde{a}}{r^2}\right]^2 > 2.0$$

In the case of a single component hydrogen plasma however $$\left[\frac{L\tilde{a}}{r^2}\right]^2$$

which fails to meet the stability criterion by a factor of 3.5.

By introducing 1000 kev. tritium through entrance port 16 and trapping it in the magnetic containment zone (e.g., by the method and apparatus for energetic neutral atom injection disclosed in the application of Charles C. Damm, assigned to the U.S. Atomic Energy Commission, entitled A Method of Multiple Atomic Beam Injection for Thermonuclear Reactors, Ser. No. 200,586, filed on June 6, 1962, which issued as Patent No. 3,152,959 on Oct. 13, 1964), until its concentration is 1% of the plasma particle density (electrons and ions), the value of $\tilde{a}^2$ is changed to 2.1 cm.$^2$.

Tritium ($A=3$, $Z=1$) has an $A/Z$ ratio 3 times greater than hydrogen ($A=1$, $Z=1$). Also, the much higher temperature of the tritium, 1000 kev., as compared to the hydrogen plasma, 40 kev., has a profound effect on the effective particle orbit radius. Thus, $\tilde{a}^2$ is changed to the higher 2.1 cm.$^2$ value without the necessity of a relative density greater than 1%. With such an addition of tritium, the stability criterion is exceeded since $$\left[\frac{L\tilde{a}}{r^2}\right]^2 = 3$$

In some instances, plasma 13 is potentially unstable only near its outer boundary. This condition occurs if the strength of the magnetic confining field 14 decreases with radial distance from its central axis 17 (as occurs between mirrors 11 and 12) while the density of plasma 13 either is constant or increases with radial distance from its axis out to the outer boundary of plasma 13 where it sharply decreases. In such cases, stabilization can be accomplished through the application of the "finite orbit effect" by introducing and trapping plasma particle additives in the magnetic field region at the beforementioned outer boundary where the density of plasma 13 decreases. This selective introduction of the plasma can be accomplished by injecting the plasma particle additives in a direction which is angularly displaced from a perpendicular to axis 17 of the confiing magnetic field 14.

In addition it is often desirable to exercise fine control over the finite orbit effect. The concentration of the additives is varied both longitudinally and radially. Consequently, the "effective" particle orbit radius is altered from the value that would result from the same number of plasma particle additives distributed randomly throughout plasma 13. This may also be accomplished by injecting the additives in a direction which is angularly displaced from axis 17. However, it is to be noted that as the angle of the axis of injection of plasma particle additives is varied, there may be provided a means, e.g., exit port 18, for the untrapped additives to be drawn out of chamber 19.

While the method of the present invention has been hereinbefore described with particular reference to an axially symmetric magnetic mirror machine, it is not intended to be limiting since variations in the geometric configuration of the magnetic confinement field result only in modification of the geometrical stability criteria, not the definition of $\tilde{a}$ nor its effect on stability. Furthermore, more than one species of plasma particle additives may be introduced and trapped in the plasma region in order to control the stability condition of the high temperature plasma. Also, in the case of an established multi-component high temperature plasma, the density, atomic mass number-to-charge ratio, or temperature parameters of the thermonuclear fuel ions or any combination thereof may be varied in the same manner as was noted for the plasma particle additives. Additionally, it should be noted that in a confined plasma in which fusion reactions are taking place, there will be a continuous creation of energetic charged particles of a species differing from the thermonuclear fuel ions. For example, in the DT reaction, i.e., deuterium-tritium, ions of $He^4$ with an energy of approximately 3.5 m.e.v. are produced. Generally, sources external to the plasma are thought of as sources of energetic plasma particles. However, by trapping a predetermined amount of $He^4$ ions in the plasma region, the plasma can be stabilized. Also, the method of the present invention can be used to controllably drive the hydromagnetic instabilities by decreasing the value of $\tilde{a}$ should it be desired to do so.

Since the inventive concept lies in the control of the stability condition of a magnetically confined plasma by controlling the "finite orbit effect," the invention should be construed liberally and be limited only by the terms of the following claims.

What I claim is:

1. In a method for controlling the hydromagnetic interchange instability of a high temperature plasma having a particle density, $N_\alpha$, constituent particles of mass number, $A_\alpha$, particle temperature in kilovolts, $T_\alpha$, and charge, $Z_\alpha$, of particles relative to a proton, said plasma confined in a containment zone of length, L, and radius, r, defined between the mirrors of a magnetic mirror containment field of magnetic field intensity, B, said plasma constituents having an effective orbit radius, $\tilde{a}$, defined by the relation $$\tilde{a}^2 = \frac{3.132 \times 10^7}{B^2}\left[\frac{\left(\sum_\alpha N_\alpha A_\alpha T_\alpha\right)^2}{Z_\alpha}\middle/\left(\sum_\alpha N_\alpha T_\alpha\right)\left(\sum_\alpha N_\alpha A_\alpha\right)\right]$$

wherein said plasma is subject to destructive hydromagnetic interchange instability when the ratio $$\left[\frac{L\tilde{a}}{r^2}\right]^2$$

is less than 2, the steps comprising injecting and trapping additive charged plasma particle constituents in said containment zone, said injected additive constituents having a higher energy level, $T_\alpha$, than the plasma particle constituents in the plasma, effective to increase the magnitude of the term $\tilde{a}$ and thereby the ratio $$\left[\frac{L\tilde{a}}{r^2}\right]^2$$

related to the constituents of said plasma to a value greater than 2, to control the hydromagnetic interchange instability of said plasma.

2. A process as defined in claim 1 wherein said additive particles have a mass to charge ratio $A_\alpha/Z_\alpha$, of at least 3.

3. A process as defined in claim 1 wherein said plasma is a hydrogen plasma and said additive charged particles are tritium particles having an energy of the order of 1000 kev. introduced in amounts to provide a density, $N_\alpha$, thereof at least 1% of the total density of said plasma.

4. A process as defined in claim 2 wherein said additive particles are introduced in a direction angularly displaced from a perpendicular to the axis of said field in the outer radial boundary region of the plasma.

References Cited by the Examiner

UNITED STATES PATENTS

| | | | |
|---|---|---|---|
| 2,997,431 | 8/1961 | Bell et al. | 176—7 X |
| 3,039,014 | 6/1962 | Chang | 176—4 |
| 3,071,525 | 1/1963 | Christofilos | 176—7 X |
| 3,120,470 | 2/1964 | Imhoff et al. | 176—7 X |
| 3,152,959 | 10/1964 | Damm | 176—1 |
| 3,170,841 | 2/1965 | Post | 176—7 X |

OTHER REFERENCES

Controlled Thermonuclear Reactions, by Samuel Glasstone et al., D. Nostrand Co., New York, 1960, p. 484.

Progress in Nuclear Energy, Series XI, Plasma Physics and Thermonuclear Research, vol. 2, The Macmillan Co., New York, 1963, pp. 22, 96, 97, and 98.

REUBEN EPSTEIN, *Primary Examiner.*